Patented Nov. 5, 1940

2,220,152

UNITED STATES PATENT OFFICE 2,220,152

COATING COMPOSITION

Charles Rapelje Hill, Toronto, Ontario, Canada

No Drawing. Application June 8, 1937,
Serial No. 147,037

13 Claims. (Cl. 260—757)

This invention relates to coating compositions for waterproofing and protecting materials and more particularly to coating compositions which have high penetrating power and provide a durable coating which is not readily broken or removed and to the method or methods of making and using the same.

The chief object of the invention is to provide a relatively inexpensive composition, which is applicable to a great variety of materials for waterproofing, weatherproofing, rustproofing and generally for protecting the same, which provides a heat resisting, flexible, elastic coating tenaciously adhering to various surfaces and entering the pores thereof and which consists of a readily available and inexpensive solvent with a minimum number of other ingredients dissolved therein in well defined proportions which in use yield results not heretofore obtainable.

There are many proposals in the art in which rubber, natural or synthetic, is dissolved with waxes, cellulose derivatives, resins, plasticisers, oils, varnishes and the like in various solvents but it has been found that peculiarly beneficial results are obtained by the use of the compositions of the present invention as hereinafter defined.

Prolonged experiments have shown that the inexpensive solvent petroleum naphtha may be employed with excellent results for the dissolution of the film-forming ingredient, rubber, a waterproofing ingredient, wax and/or a suspending ingredient, resin, when close attention is paid to the balancing of the film-forming ingredients with the other or others in the solvent. While the peculiar effectiveness of these simple and relatively inexpensive compositions is not fully understood it is believed to be due, at least in part, to the proportioning of the ingredients in the solvent and particularly to the amount of rubber employed with the wax or resin alone or with the wax and resin together. The solution has high powers of penetration and enters even minute pores of surfaces coated therewith. When the solvent evaporates, a thin, continuous and flexible film remains tenaciously adhering to the surface and in the pores thereof serving as a bond for the waterproofing wax and/or the resin which assists in carrying in uniform suspension and distribution pigments, powders or the like which may be desired as hereinafter described.

A petroleum type naphtha is employed. Its flash point should not be so low as to cause a fire hazard. That having a flash point of approximately 100 is satisfactory. Its specific gravity is about .75. Other solvents, although capable of acting as such, produce undesirable characteristics, such as tackiness, in the coatings.

As film-forming and bonding agent pure crepe rubber is employed and to ensure solution in the solvent it is effectively milled for say twenty minutes and cut into strips preferably approximately 6" by 1". If the pieces are too small, for example 1" by 1" they form in the solvent into glue-like masses which do not readily dissolve. If substantially larger than that indicated the tendency is to form a matted mass which is not readily broken up by stirring owing to the character of the rubber. The effective milling is essential. Without it the desired results are not obtained.

As waterproofing and polishing agent the paraffin wax used preferably has a high melting point of for example 141–143° F. and is pulverized to facilitate solution. Mineral wax when used preferably has a melting point of approximately 195° F.

As suspending agent the resin employed may be various of the synthetic resins or ester gums having the desired color, rapidity of drying and resistance to water. To be consistent with one of the objects of the invention they must be in the low price field.

The preferred and basic compositions are as follows:

A. A substantially colorless fluid consisting of 2 ounces of rubber as described and 2 ounces of paraffin wax in an imperial gallon of naphtha.

B. A more or less colored fluid consisting of 2 ounces of the rubber, 2 ounces of paraffin wax and 3 pounds of resin in an imperial gallon of naphtha.

C. A somewhat colored fluid consisting of 6 ounces of rubber and 16 ounces of resin in an imperial gallon of naphtha.

D. A somewhat colored fluid consisting of 2 ounces of rubber and 16 ounces of resin in an imperial gallon of naphtha.

It has been found that two ounces of rubber balances two ounces of paraffin in the specified quantity of solvent and that when this balance is disturbed by the presence of additional wax the coating, formed after evaporation of the solvent, becomes progressively tacky, an undesirable characteristic. Similarly it has been found that the fluid is balanced with two ounces of rubber and sixteen ounces of resin. The fluid composition is likewise balanced with two ounces of rubber, two ounces of wax and sixteen ounces of resin. It will be observed that composition B is overbalanced to the extent of 200% in respect of resin and C to the same extent in respect of rubber. This overbalancing is necessary to make provision for adequate covering of certain materials depending upon the character of their surface and structure. To illustrate, in the coating of steel which has a relative smooth, non-porous surface structure where a heavy clear coating is desired the overbalancing in resin of composition B is necessary and the balanced bond is capable of carrying the extra two pounds of resin to provide a thicker coat. Similarly this composition is capable of bonding to such surfaces a relatively small volume of metallic or other powders, such, for example, as aluminum, copper, or bronze powder, powdered barytes or the like. Similarly in the coating of materials, such as concrete, brick, wood, wallboard or the like, having a fibrous structure or porous surface the overbalancing in rubber of composition C constitutes it a combined vehicle and bonding medium capable of carrying and bonding as much as 12 pounds of powdered metal or the like to the gallon of solvent. This composition with the metal powder constitutes a paint of high bonding and covering capacity and requiring but a single application. It will not flake or powder, an undesirable feature common in the art. As a coating, composition C of itself, that is without the powder, is not desirable. When the solvent is evaporated there remains a sticky mass which dries slowly and is difficult to handle. The excessive rubber is necessary however for bonding heavy deposits of powdered metal or the like. From the point of view of waterproofing only this overbalancing in rubber is undesirable and detrimental.

In preparing the compositions the prepared rubber, wax and/or resin are premixed in the desired proportions or are simultaneously introduced into the solvent and stirred or agitated to hasten solution. The rapidity of dissolution in the naphtha, an important factor in commercial operation, is thus substantially increased.

The compositions may be applied by brushing, spraying, immersion or in any of the usual ways of applying similar coatings. Owing to their low viscosity the compositions readily penetrate into materials coated and as the solvent evaporates a continuous flexible and elastic film of the bonding agent is left tenaciously holding the waterproofing wax and other materials in place. Coatings of B, C and D will withstand the effect of changes in temperature between —60° F. and substantially 360° F. and are thus not broken by expansion or contraction of coated materials caused by such changes. Coatings of A will withstand all climatic temperature conditions.

Oil-soluble dyes may be incorporated where such colors are desired and the powders previously mentioned may be pigments, such as iron oxide, zinc oxide or the like. Barytes may be used as a filler and for the maintenance of texture. Mineral wax may be added to provide a heavier protecting coat, to improve lustre and to provide for friction polishing, as in the case of leather or the like. Indeed shoes so treated require no additional treatment for long periods of time and the lustre may be renewed by ordinary rubbing.

To illustrate the broad field of materials to which the coatings have been applied and to indicate the preferred field for each of the specific compositions the following examples are given.

Composition A is particularly suitable for treating materials such as dress and other fabrics, umbrellas, awnings, tents, netting and the like; paper, including wallpapers, paper hats and the like. When for example, white crepe paper is coated with this composition in which an oil-soluble dye is incorporated the paper retains its original crepe form and without loss of color even when subjected to the influence of water. This substantially extends the field of usefulness of such papers and at small cost. Wrapping paper and box board may be similarly treated with or without dye. The coated surfaces may be printed upon. For tarpaulins or similar fabrics required to hold or withhold water for substantial periods mineral wax in the proportion of substantially 8 ounces per gallon is incorporated in this composition. Flexibility of the fabric is retained. Velvet has been treated with the composition to which 2 pounds of barytes per gallon were added. The velvety texture was maintained. The composition is valuable for general household utility as well.

Composition B is well adapted for coating various metals and wood, and powdered barytes, powdered metals and dyes may be added. For example, the addition of one pound of barytes and one pound of metal powder per gallon makes an excellent coating for iron.

Composition C with its resin content and substantial overbalancing in rubber is particularly suitable when it is desired to include substantial portions of powdered materials as metals, pigments or fillers. For example 6 pounds of zinc oxide and 6 pounds of barytes to the gallon makes a paint coating for white pine or the like. One pound of powdered aluminum and one pound of barytes per gallon will adhere to structural steel and galvanized iron without pretreatment of the latter. In the case of porous surfaces such as in wallboard the bonding of the paint solids to the surface fibres prevents undue penetration and waste of materials.

Composition D is adapted for coating materials with a smooth surface and minimum porosity such as metal, hardwood, furniture, glassine paper and the like. For hardwood flooring or furniture or linoleum for example, 4 pounds of powdered barytes per gallon may be added as a filler and 6 ounces of mineral wax for a lustrous finish. Similarly 1 ounce of a dye may be included if desired. Glassine paper coated with this composition is made approximately 35% more transparent and absolutely waterproof for all commercial purposes, and is an economical wrapping paper which is heat sealing.

The importance of "balance" of dissolved ingredients in the compositions has been stressed and the preferred balanced proportions have been set forth, but it is to be understood that variation may be made in the description given within the limits of the balance stated without departing from the nature or spirit of the present invention as defined in the appended claims. While balance of solids is of major importance, its relation to the quantity of solvent is also important but the specific amount of solids specified in the preferred compositions and stated in the claims may be varied by 25% within the scope of the invention and it is intended that the claims shall be so interpreted. It will be understood however that departure from the preferred proportion of solvent is at the expense of the benefits provided by the invention.

This application is a continuation in part of application Serial Number 3,810, filed January 28, 1935.

I claim:

1. A fluid coating composition comprising petroleum naphtha containing in solution two ounces of rubber, two ounces of paraffin wax and three pounds of resin per gallon of naphtha.

2. A composition as defined in claim 1 containing an oil-soluble dye.

3. A composition as defined in claim 1 containing in suspension in said solution substantially one pound of powdered barytes and substantially one pound of powdered metal per gallon.

4. A paint consisting of powdered metal in suspension in a solution of petroleum naphtha, rubber and resin, the solution containing not less than two ounces nor more than six ounces of rubber and sixteen ounces of resin per gallon of naphtha.

5. A fluid coating composition comprising naphtha solvent, rubber and resin, the rubber and resin being balanced in the proportions of substantially two ounces of rubber and sixteen ounces of resin per gallon of solvent.

6. A composition as defined in claim 5 wherein the solution is overbalanced in resin to the extent of not more than 200%.

7. A composition as defined in claim 5 wherein the solution is overbalanced in rubber to the extent of not more than 200%.

8. A fluid coating composition comprising a solvent with resin as a major constituent and a minor quantity in substantially equal proportions of rubber and wax.

9. A composition as set forth in claim 8 and containing a powdered mineral material.

10. A composition as set forth in claim 8 having in suspension therein powdered bartyes.

11. A composition as set forth in claim 8 having in suspension therein substantially one pound of powdered bartyes and one pound of powdered metal per gallon.

12. A composition as set forth in claim 5 containing mineral wax.

13. A composition as set forth in claim 5 containing in suspension a powdered mineral filler.

CHARLES RAPELJE HILL.